United States Patent [19]

Kawano et al.

[11] Patent Number: 4,756,379
[45] Date of Patent: Jul. 12, 1988

[54] MOTORCYCLE

[75] Inventors: Akio Kawano; Kentaro Kato; Kenji Honma; Keiji Ono, all of Saitama, Japan

[73] Assignee: Honda Giken Kogyo Kabushiki Kaisha, Tokyo, Japan

[21] Appl. No.: 57,766

[22] Filed: Jun. 3, 1987

[30] Foreign Application Priority Data

Jun. 4, 1986 [JP] Japan ................. 61-129844
Aug. 25, 1986 [JP] Japan ................. 61-198648
Aug. 25, 1986 [JP] Japan ............ 61-129169[U]

[51] Int. Cl.$^4$ .................... B62K 21/02; B62K 25/16
[52] U.S. Cl. ................................ 180/219; 280/270
[58] Field of Search .............. 180/219, 226, 227; 280/277, 270, 274, 275, 276, 283-288

[56] References Cited

U.S. PATENT DOCUMENTS

| 3,521,904 | 7/1970 | Sheffer | 280/270 |
| 4,265,329 | 5/1981 | de Cortanze | 180/219 |
| 4,526,249 | 7/1985 | Parker | 180/219 |
| 4,624,470 | 11/1986 | Love | 180/219 |
| 4,638,881 | 1/1987 | Morioka et al. | 180/219 |
| 4,662,469 | 5/1987 | Matsuda et al. | 180/219 |

FOREIGN PATENT DOCUMENTS

53-142739 12/1978 Japan .
58-49435 11/1983 Japan .
7805244 11/1978 Netherlands .
555975 9/1943 United Kingdom .
833741 4/1960 United Kingdom .

Primary Examiner—Richard A. Bertsch
Attorney, Agent, or Firm—Irving M. Weiner; Joseph P. Carrier; Pamela S. Burt

[57] ABSTRACT

A motorcycle having a swing-arm front suspension mechanism includes front and rear wheels, an engine disposed between the front and rear wheels and having an engine block, a front wheel steering knuckle disposed on one side of the front wheel and by which an axle of the front wheel is rotatably supported, an upper swing arm having a front end pivotally coupled to the knuckle and a rear end pivotally coupled to an upper portion of the engine block, the upper swing arm extending between the knuckle and the engine block, a lower swing arm having a front end pivotally coupled to the knuckle and at least one rear end pivotally coupled to a lower portion of the engine block, the lower swing arm extending between the knuckle and the engine block, and a damper having an upper end pivotally coupled to the engine block intermediate between two positions where the rear ends of the upper and lower swing arms are pivotally coupled to the engine block, and a lower end pivotally coupled to a base of the lower swing arm. The motorcylce also includes an arm mechanism disposed below the lower swing arm, the lower end of the damper being pivotally coupled by the arm mechanism to the base of the lower swing arm.

13 Claims, 4 Drawing Sheets

MOTORCYCLE

BACKGROUND OF THE INVENTION

1. Field of the Invention

The present invention relates to a motorcycle, and more particularly to a motorcycle having a swing-arm front suspension mechanism.

2. Description of the Relevant Art

There are known motorcycles having a swing-arm front suspension mechanism including upper and lower parallel swing arms supporting a front wheel at their front ends with a front wheel support member such as a knuckle.

For example, U.S. Pat. No. 4,265,329 discloses a frameless motorcycle equipped with a front suspension mechanism comprising upper and lower swing arms.

In the disclosed motorcycle, a joint plate is fixed to the front end of an engine positioned substantially centrally of the motorcycle. The upper swing arm has its base swingably coupled to an upper portion of the joint plate, whereas the lower swing arm has its base swingably coupled to a lower portion of the joint plate. The front ends of the swing arms are pivotally coupled to upper and lower portions, respectively, of a front wheel steering support member on which the axle of the front wheel is rotatably supported and to which a tie rod extending from a steering device is connected. The front suspension mechanism thus constructed also includes an elongate damper having a lower end pivotally coupled to a bracket mounted on an upper portion of an intermediate region of the lower swing arm and an upper end pivotally joined to an upward extension from an upper portion of the joint plate. The motorcycle also has a rear joint plate secured to a rear portion of the engine. A rear wheel is rotatably supported on a rear fork with its front end swingably connected to the rear joint plate.

With the above front swing arm suspension mechanism of the disclosed motorcycle, however, the front joint plate is required and hence the number of necessary components associated with the joint plate is undesirably large. Also, the process of attaching the joint plate to the engine undesirably increases the time required for assembling and servicing the motorcycle. Moreover, the wheel base between the front and rear wheels is increased by the front and rear joint plates through which the swing arms supporting the front wheel and the rear fork supporting the rear wheel are indirectly swingably connected to the engine.

To reduce the wheel base, the joint plates may be dispensed with and the upper and lower swing arms may be pivotally coupled to the engine near its front surface. One such arrangement is employed on a motorcycle disclosed in Japanese Laid-Open Patent Publication No. 53-142739.

The disclosed motorcycle includes a centrally located engine unit comprising an engine and a gear box which are integral with each other. A subframe is disposed on an upper portion of the engine, and a pair of upper and lower front swing arms is coupled to the subframe and the engine. More specifically, the upper swing arm has one end pivotally coupled to the subframe, and the lower swing arm has one end pivotally coupled to the engine unit. The other distal ends of the upper and lower swing arms are connected to upper and lower portions, respectively, of a front wheel support member such as a knuckle by which a front wheel is rotatably supported. The subframe, the engine, the upper and lower swing arms, and the front wheel support member substantially form a parallelogram. A damper has a lower end pivoted to an intermediate portion of one of the upper and lower swing arms and an upper end pivoted to the subframe at a position above the point where the upper swing arm is pivotally coupled to the subframe. The front wheel can be steered by a steering arm coupled to the front wheel support member and connected to a handlebar disposed above the subframe.

This type of motorcycle has a simpler frame and is much lighter than a conventional motorcycle having a head pipe and the motorcycle, described above, which has joint plates.

In the motorcycle of the type described, loads or shocks applied from the front wheel are generally borne by the upper and lower swing arms. With a motorcycle having a low center of gravity, however, it is preferable to have the lower swing arm bear larger loads or shocks than the upper swing arm.

The lower swing arm of the motorcycle disclosed in Japanese Laid-Open Patent Publication No. 53-142739 is pivotally coupled to a bracket projecting from a lower portion of the front area of the engine. For the lower swing arm to be able to bear larger loads or shocks, the bracket must be reinforced for higher rigidity, and hence be of increased dimensions. The bracket of such a structure, however, prevents the engine from being located in a low position and also prevents the motorcycle from having a low center of gravity. The front wheel of the motorcycle is preferably given a positive caster angle in order to permit the motorcycle to run stably in a straight course. In order that the upper and lower swing arms with the positive caster angle on the front wheel extend substantially parallel to each other, the base end of the upper swing arm should be positioned in a central upper area of the motorcycle. Where an L-shaped engine unit having cylinders erected upwardly from a crankcase is mounted on the motorcycle, however, the base end of the upper swing arm must be located in front of the engine since otherwise the base end of the upper swing arm would interefere with the engine cylinders. In order to keep the upper and lower swing arms substantially parallel to each other with the positive caster angle, the base end of the lower swing arm is positioned more forwardly of the engine than the base end of the upper swing arm, with the result that the wheel base becomes excessively long.

SUMMARY OF THE INVENTION

In view of the aforesaid drawbacks of the conventional motorcycle front suspension mechanisms, it is an object of the present invention to provide a motorcycle having a front suspension mechanism which allows the wheel base between front and rear wheels to be reduced, resulting in a low center of gravity of the motorcycle.

According to the present invention, the above object can be achieved by a motorcycle including front and rear wheels, an engine disposed between the front and rear wheels and having an engine block, a front wheel steering knuckle disposed on one side of the front wheel and by which an axle of the front wheel is rotatably supported, an upper swing arm having a front end pivotally coupled to the knuckle and a rear end pivotally coupled to an upper portion of the engine block, the upper swing arm extending between the knuckle and the engine block, a lower swing arm having a front end pivotally coupled to the knuckle and at least one rear end pivotally coupled to a lower portion of the engine block, the lower swing arm extending between the knuckle and the engine block, and a damper having an upper end pivotally coupled to the engine block intermediate between two positions where the rear ends of the upper and lower swing arms are pivotally coupled to the engine block, and a lower end pivotally coupled to a base of the lower swing arm.

The motorcycle also includes an arm mechanism disposed below the lower swing arm, the lower end of the damper being pivotally coupled by the arm mechanism to the base of the lower swing arm.

The knuckle has a lower end by which the axle of the front wheel is rotatably supported, an extension inclined a prescribed angle rearwardly in side elevation and disposed on one side of the front wheel and an upper end on the extension. The extension has a curved shape and extends from the lower end thereof to a position rearward of a top of the front wheel. The front end of the upper swing arm is pivotally coupled to the upper end of the knuckle, and the front end of the lower swing arm is pivotally coupled to the lower end of the knuckle. The four pivot points where the upper and lower swing arms are pivoted to the knuckle and the engine block are positioned respectively at the corners of a parallelogram.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
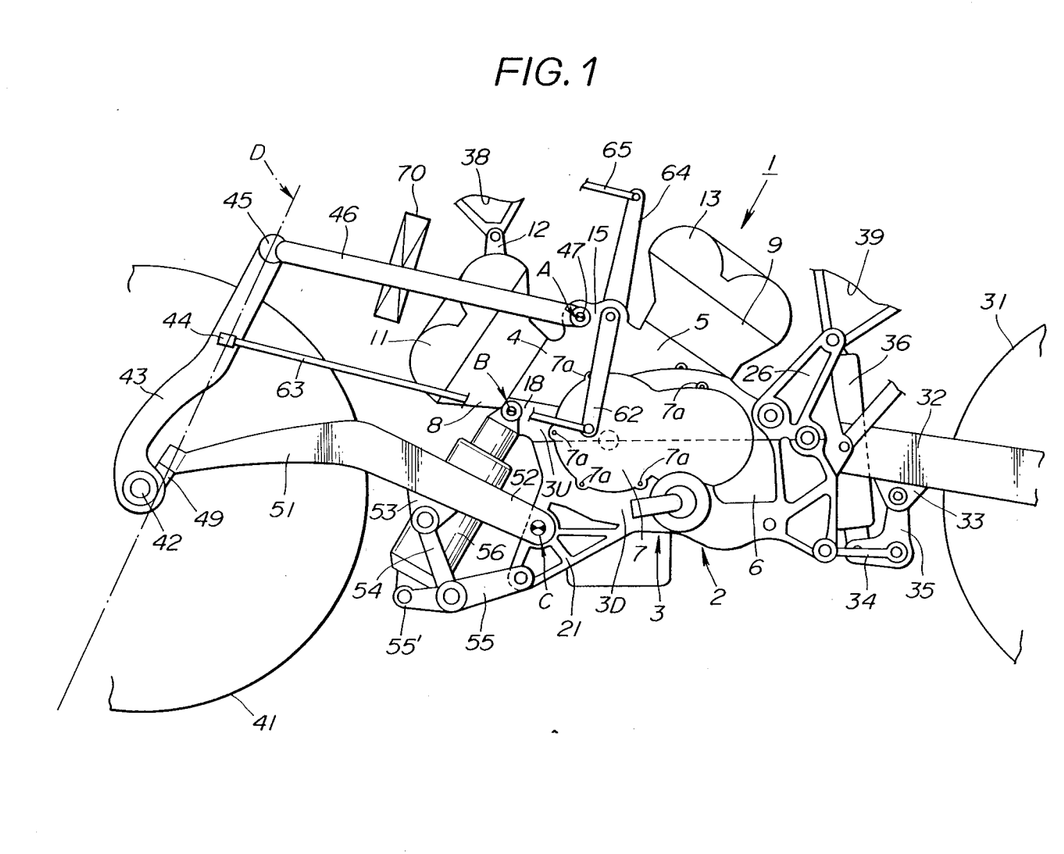
FIG. 1 is a fragmentary schematic side elevational view of a motorcycle according to a first embodiment of the present invention.

As shown in FIG. 1, a motorcycle according to a first embodiment of the present invention includes an engine 1 centrally located between a front wheel 41 and a rear wheel 31. The engine 1 is a four-cycle, four-cylinder internal combustion engine which is substantially V-shaped in side elevation. The engine 1 has a unitary structure including a crankcase 3 which can be divided into upper and lower members 3U, 3D, front and rear cylinder assemblies 4, 5, and a transmission case 6. A side cover 7 is mounted on a central side of the engine block 2 and fastened as by bolts 7a to the upper and lower crankcase members 3U, 3D. Cylinder heads 8, 9 are mounted as by bolts respectively on the front and rear cylinder assemblies 4, 5 of the upper crankcase case member 3U of the crankcase 3. Head covers 11, 13 are mounted as by bolts respectively on the front and rear cylinder heads 8, 9, the front head cover 11 having a boss 12 on which an upper component 38 is supported.

The engine 1 is disposed centrally on the motorcycle.

Figure 2:
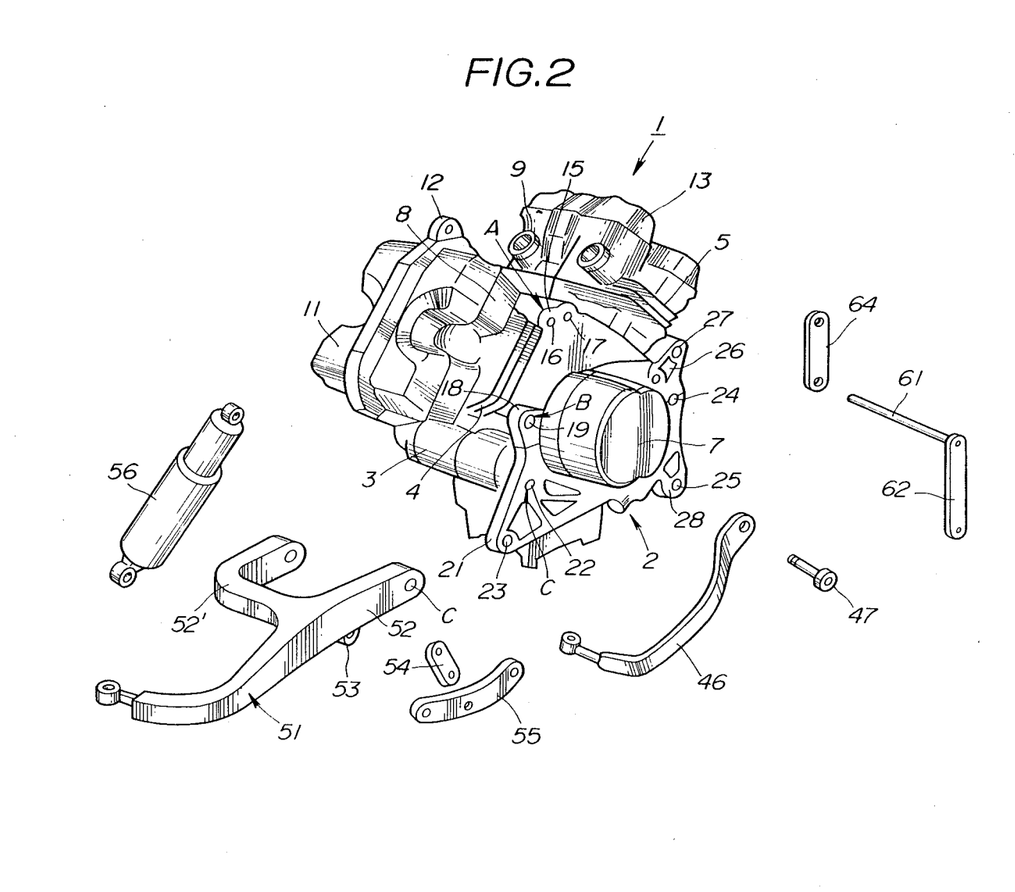
FIG. 2 is an exploded perspective view of a portion of the motorcycle shown in FIG. 1.

As shown in FIG. 2, the engine block 2 has a first boss 15 on one side thereof, i.e, the righthand side thereof as viewed in front elevation of the motorcycle, the first boss 15 being disposed on the upper crankcase member 3U and projecting upwardly between the front and rear cylinder assemblies 4, 5. The first boss 15 has front and rear pivot holes 16, 17 defined transversely of the motorcycle. The engine block 2 also has a second boss 18 disposed at the base of the front cylinder assembly 4 and inclined forwardly parallel to the front cylinder assembly 4, the second boss 18 having a pivot hole 19 defined therein. The engine block 2 further has a third boss 21 projecting obliquely downwardly from a front portion of the lower crankcase member 3D of the engine block 2, the third boss 21 having upper and lower pivot holes 22, 23 defined therein.

A pivot hole 24 is defined in a vertically central portion of the rear area of the cylinder block 2. The engine block 2 has a fourth boss 26 projecting obliquely upwardly from an engine block portion above the pivot hole 24, the fourth boss 26 having a pivot hole 27 defined in its distal end. The engine block 2 also has a fifth boss 28 projecting obliquely downwardly from a rear lower portion thereof, the fifth boss 28 having a pivot hole 25 defined therein.

As illustrated in FIG. 1, a rear swing arm 32 on which the rear wheel 31 is rotatably supported is pivotally supported by the pivot hole 24 at the rear area of the engine block 2. The rear swing arm 32 is also operatively coupled to the engine block 2 by a V-shaped bell crank 35 pivotally coupled at one end to a boss 33 projecting downwardly from the lower surface of the rear swing arm 32, and a link 34 having one end pivoted to an intermediate portion of the bell crank 35 and the other end pivotally supported by the pivot hole 25. A hydraulic damper 36 has its upper and lower ends pivotally supported by and between the pivot hole 27 of the fourth boss 26 and the other end of the bell crank 35. A component 39 is also supported by the pivot hole 27 of the fourth boss 26.

The front wheel 41 has an axle 42 rotatably supported on the lower end of a knuckle 43 disposed on one side of the front wheel 41. The knuckle 43 is an elongate member inclined rearwardly as viewed in side elevation. The knuckle includes an extension curved outwardly out of intereference with the tire of the front wheel 41 and extending up to a position behind the top of the front wheel 41, and an upper end at the top of the extension.

The front end of an upper swing arm 46 is pivotally coupled to the upper end of the knuckle 43 through a ball joint 45. The lower end of the knuckle 43 is pivotally coupled to the front end of a lower swing arm 51 through a ball joint 49. An axis D passing through the ball joints 45, 49 and about which the front wheel 41 is steerable has a positive caster angle and is aligned with the vertical central axis of the motorcycle.

The rear end of the upper swing arm 46 is pivotally supported by a pivot shaft 47 disposed in the pivot hole 16 of the first boss 15 of the engine block 2.

As shown in FIG. 2, the the lower swing arm 51 is substantially y-shaped as viewed in plan and has a front portion curved outwardly to one side out of interference with the front wheel tire and an intermediate portion comprising a main bar 52 curved upwardly and extending rearwardly and an auxiliary bar 52' branched transversely inwardly from a position behind the upwardly curved portion of the main bar 52. The rear end of the main bar 52 of the lower swing arm 51 is pivotally supported by the upper pivot hole 22 of the third boss 21 of the engine block body near the base of the third boss 21. The rear end of the auxiliary bar 52' is also pivotally coupled to the engine block 2 by a pivot hole (not shown) defined in the side thereof opposite to the third boss 21. A boss 53 is mounted on the lower surface of the lower swing arm 51 behind the upwardly curved portion of the main bar 52.

As illustrated in FIG. 1, an arm mechanism is disposed below the base end of the lower swing arm 51 which is pivotally connected to the engine 1. The arm mechanism comprises a first arm 55 having one end pivotally coupled to the lower pivot hole 23 of the third boss 21 and a second arm 54 having upper and lower ends pivotally coupled to the boss 53 on the lower swing arm 51 and an intermediate portion of the first arm 55. A hydraulic damper 56 extends substantially vertically and is positioned between the main and auxiliary bars 52, 52' of the lower swing arm 51. The hydraulic damper 56 has an upper end pivotally joined to the pivot hole 19 of the second boss 18 and a lower end pivotally coupled to the other end of the first arm 55. Therefore, the lower end of the damper 56 is indirectly connected to the engine block 2 by the arm mechanism below the lower swing arm 51, so that the point where the upper end of the damper 56 is pivoted to the engine block 2 can be held in a lower position.

The pivot point A where the upper swing arm 46 is pivotally joined directly to the engine block 2 is positioned on an upper portion of the engine block 2. The pivot point B where the hydraulic damper 56 is pivotally coupled directly to the engine block 2 is positioned on a vertically intermediate portion of the engine block 2. The pivot point C where the lower swing arm 51 is pivotally coupled directly to the engine block 2 is positioned on a lower portion of the engine block 2.

The upper and lower swing arms 46, 51 are directly coupled to the engine block 2 without using any joint plates or the like, with the result that the wheel base between the front and rear wheels 41, 31 can be reduced. Loads or shocks from the front wheel 41 act on the pivot points C, B which are in lowered positions as shown in FIG. 1. The center of gravity of the engine block 2 is lowered and hence so is the center of gravity of the motorcycle. Usually, gaskets are interposed between the cylinder assemblies 4, 5 and the cylinder heads 8, 9. Since the upper and lower swing arms 46, 51 are supported respectively on the first and third bosses 15, 21 of the cylinder block 2, the loads or shocks from the front wheel 41 are not applied to the cylinder heads 8, 9, and hence the sealing capability of the gaskets are maintained without deterioration which would otherwise be caused by repeated application of external stresses or loads.

In the above embodiment, the first, second, and third bosses 15, 18, 21 project from the engine block 2 as pivot joints. However, the rear ends of the upper and lower swing arms 46, 51 and the upper end of the damper 56 may be pivotally coupled to other suitable pivot joints instead of such bosses.

Figure 3:
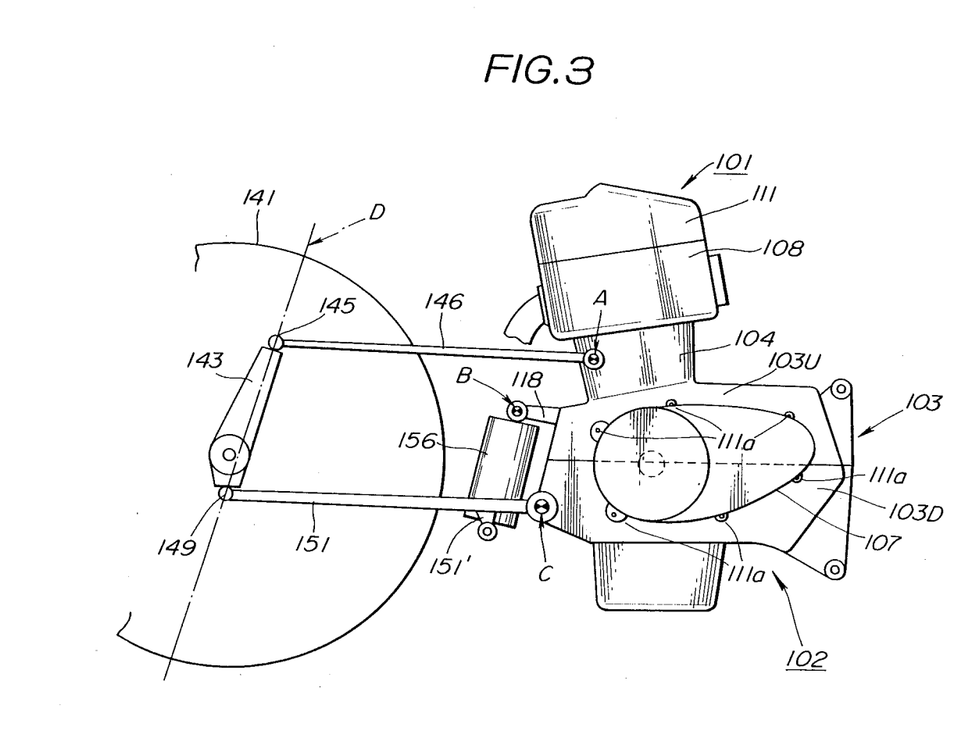
FIG. 3 is a fragmentary schematic side elevational view of a motorcycle according to a second embodiment of the present invention.

FIG. 3 shows a motorcycle having a swing-arm front suspension mechanism according to a second embodiment of the present invention.

An engine 101 of the motorcycle is of an upstanding configuration having an engine block 102 comprising a crankcase 103 which can be divided into lower and upper crankcase members 103D, 103U, a cylinder assembly 104 erected from the upper crankcase member 103U, and a cylinder head 108 fixed as by bolts to the cylinder assembly 104. A side cover 107 is mounted on one side of the crankcase 103 and fastened to the upper and lower crankcase members 103U, 103D as by bolts 111a. The cylinder head 108 has its upper surface covered with a head cover 111. The upper crankcase member 103U has a boss 118 projecting forwardly from an upper front surface thereof.

A front wheel 141 has an axle rotatably supported on the lower end of an vertically elongate knuckle 143 disposed on one side of the front wheel 141. The knuckle 43 has an upper end located laterally of an upper half portion of the front wheel 141. An upper swing arm 146 has a rear end pivotally coupled to a front portion A of one side of the cylinder assembly 104 which is the same as the side on which the knuckle 143 lies with respect to the front wheel 141. The front end of the upper swing arm 146 is pivotally joined to the upper end of the knuckle 143 through a ball joint 145. A lower swing arm 151 has a rear end pivotally coupled to a front portion C of one side of the lower crankcase member 103D which is the same as the side on which the knuckle 143 lies with respect to the front wheel 141. The front end of the lower swing arm 151 is pivotally joined to the lower end of the knuckle 143 below the wheel axle through a ball joint 149.

A hydraulic damper 156 has an upper end pivotally coupled to the boss 118 and a lower end pivotally joined to a boss 151' projecting downwardly from a rear portion of the lower swing arm 151.

The pivot point A where the upper swing arm 146 is pivoted directly to the engine block 102 is located on an upper portion of the engine block 102. The pivot point B where the hydraulic damper 156 is pivoted directly to the engine block 102 is positioned on a vertically intermediate portion of the engine block 102. The pivot point C where the lower swing arm 151 is pivoted directly to the engine block 102 is positioned on a lower portion of the engine block 102. Therefore, the motorcycle of the second embodiment has the same advantages as those which are offered by the motorcycle of the first embodiment. Further, by connecting the lower end of the damper 156 indirectly to the lower swing arm 151 through an arm mechanism such as that employed in the first embodiment, the damper can be lowered in position, and hence the center of gravity of the motorcycle can also be lowered.

A motorcycle having a swing-arm front suspension mechanism according to a third embodiment of the present invention will be described hereinbelow with reference to FIGS. 4 through 6.

Figure 4:
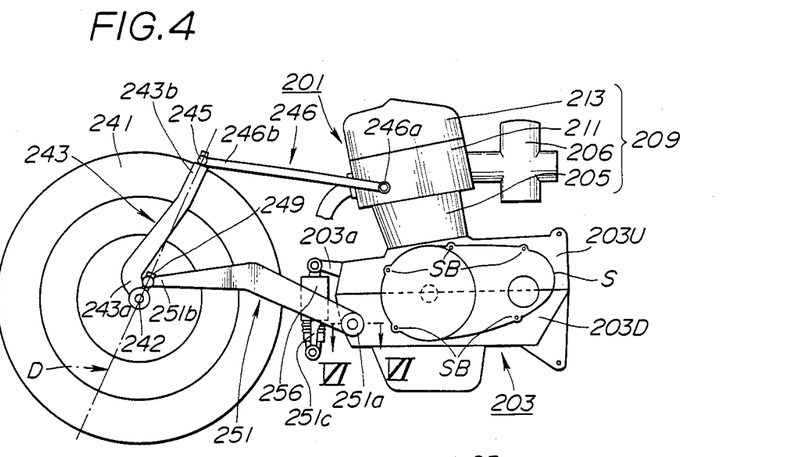
FIG. 4 is a fragmentary schematic side elevational view of a motorcycle according to a third embodiment of the present invention.
Figure 5:
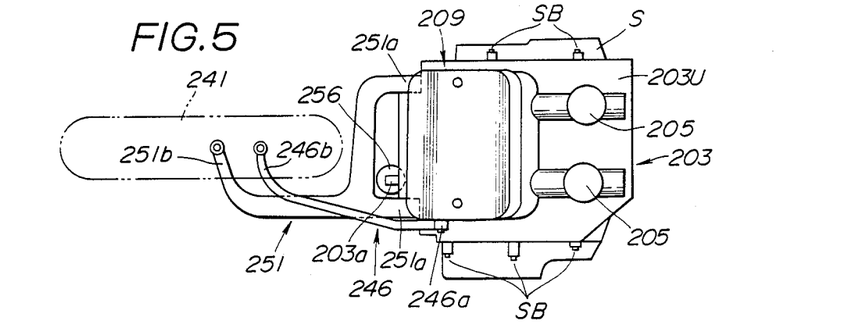
FIG. 5 is a plan view of the motorcycle shown in FIG. 4.

FIG. 4 shows a front half of the motorcycle. An engine 201 on the motorcycle is a four-cycle, four-cylinder engine comprising a crankcase 203 which can be divided into lower and upper crankcase members 203D, 203U, a cylinder assembly 205 erected from the upper crankcase member 203U, and a cylinder head 211 mounted on the cylinder assembly 205. A head cover 213 is mounted on the upper surface of the cylinder head 211, and a carburetor 206 is disposed behind and connected to the cylinder head 211. The cylinder assembly 205, the cylinder head 211, the head cover 213, and the carburetor 206 jointly constitute a cylinder block 209. A side cover S is mounted on each side of the crankcase 203 and fastened to the upper and lower crankcase members 203U, 203D as by bolts SB.

A front wheel 241 is disposed in front of the engine 201. A vertically elongate knuckle 243 is positioned on one side of the front wheel 241 for steering the front wheel 241, which has an axle 242 rotatably supported on the lower end 243a of the knuckle 243. The elongate knuckle 243 has a base bar extending obliquely forwardly at an angle from the axle supporting end thereof, and an extension inclined obliquely rearwardly from the base bar and curved outwardly out of interference with the tire of the front wheel 241, the extension extending up to a position substantially behind the top of the front wheel 241.

The knucle 243 has an upper end 243b at the top of the extension thereof, which is pivotally coupled by a ball joint 245 to the front end 246b of an upper swing arm 246 which extends between the front wheel 241 and the engine 201. The rear end 246a of the upper swing arm 246 is pivotally joined to a front portion of one side of the cylinder head 211 which is the same as the side of the front wheel 241 on which the knuckle 243 is disposed.

The lower end 243a of the knuckle 243 is coupled by a ball joint 249 to the front end 251b of a lower swing arm 251 extending forwardly from a front portion of the lower crankcase member 203D. As shown in FIG. 5, the lower swing arm 251 is of a substantially y-shaped configuration, as viewed in plan, including rear main and auxiliary bars having laterally spaced rear ends 251a, respectively.

Figure 6:
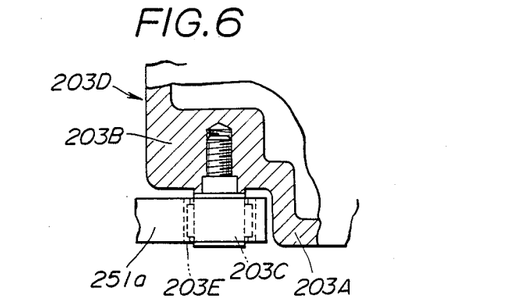
FIG. 6 is an enlarged cross-sectional view taken along line VI—VI of FIG. 4.

As illustrated in FIG. 6, the lower crankcase member 203D has two laterally spaced, front side walls 203A (one shown) each reinforced by a thick wall portion 203B on which a bolt 203C is threaded. The rear ends 251a of the lower swing arm 251 are pivotally coupled to the side walls 203A by a bearing 203E mounted on the bolt 203C.

The lower swing arm 251 has a bracket 251C (FIG. 4) projecting downwardly therefrom near one of the rear ends 251a. The upper crankcase member 203U has a bracket 203a projecting forwardly from a front portion thereof. A damper unit 256 extending vertically and disposed between the main and auxiliary bars of the lower swing arm 251 has upper and lower ends coupled to the brackets 203a, 251C, respectively.

The ball joints 245, 249 and the pivotally coupled rear ends 246a, 251a of the upper and lower swing arms 246, 251 are located respectively at the corners of a parallelogram which is maintained at all times so that the elongate knuckle 243 remains inclined rearwardly at a constant angle. Where the lower end of the damper 256 is coupled indirectly to the lower swing arm 251 through an arm mechanism such as that employed in the first embodiment, the damper 256 can be lowered in position, and the center of gravity of the motorcycle can also be lowered.

The lower swing arm 251 to which large loads or shocks are applied from the front wheel 241 is supported on the lower crankcase member 203D of high rigidity or the thick wall portions 203B of the side walls 203A of the lower crankcase member 203D, and the upper swing arm 246 to which smaller loads or shocks are applied from the front wheel 241 is supported on the cylinder head 211. Therefore, stress concentration on the engine 201 is avoided, and any reinforcement required on the engine 201 is minimized. The weight of the entire motorcycle can thus be reduced.

Since the rear end 246a of the upper swing arm 246 is pivotally supported on the side wall of the cylinder head 211 and may easily be positionally adjusted, a positive caster angle can easily be established for the steering axis D passing through the ball joints 245, 249. The distance between the front wheel 241 and the engine 201 is reduced without shortening the lengths of the swing arms 246, 251, so that the wheel base is not unduly increased.

While the lower swing arm 251 is shown as being pivotally supported on the lower crankcase member 203D, it may be pivotally supported on the upper crankcase member 203U. While the upper swing arm 246 is shown as being pivotally supported on the cylinder head 211, it may be pivotally supported on the cylinder assembly 205, the head cover 213, etc.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. A motorcycle comprising:
    front and rear wheels;
    an engine disposed between said front and rear wheels and having an engine block;
    a front wheel steering knuckle disposed on one side of said front wheel and by which an axle of said front wheel is rotatably supported;
    an upper swing arm having a front end pivotally coupled to said knuckle and a rear end pivotally coupled to an upper portion of said engine block, said upper swing arm extending between said knuckle and said engine block;
    a lower swing arm having a front end pivotally coupled to said knuckle and at least one rear end pivotally coupled to a lower portion of said engine block, said lower swing arm extending between said knuckle and said engine block; and
    a damper having an upper end pivotally coupled to said engine block intermediate between two positions where said rear ends of the upper and lower swing arms are pivotally coupled to said engine block, and a lower end pivotally coupled to a base of said lower swing arm.

2. A motorcycle according to claim 2, further including an arm mechanism disposed below said lower swing arm, said lower end of the damper being pivotally coupled by said arm mechanism to said base of the lower swing arm.

3. A motorcycle according to claim 2, wherein said arm mechanism comprises a first arm and a second arm, said first arm having a rear end pivotally coupled to a boss projecting substantially downwardly from said engine block near the point where said lower swing arm is pivotally coupled to said engine block, and a front end pivotally coupled to said lower end of the damper, said second arm having an upper end pivotally coupled to a boss projecting downwardly from said base of the lower swing arm and a lower end pivotally coupled to an intermediate portion of said arm.

4. A motorcycle according to claim 3, wherein said engine block has two front and rear cylinder assemblies inclined forwardly and rearwardly in a longitudinal direction of the motorcycle, said rear end of the upper swing arm being pivotally coupled to a boss projecting from said engine block between said front and rear cylinder assemblies on one side of the engine block which is the same as the side on which said knuckle is disposed.

5. A motorcycle according to claim 4, wherein said knuckle has a lower end by which said axle of said front wheel is rotatably supported, an extension inclined a prescribed angle rearwardly in side elevation and disposed on one side of said front wheel, said extension having a curved shape and extending from the lower end thereof to a position rearward of a top of said front wheel, and an upper end on said extension, said front end of said upper swing arm being pivotally coupled to said upper end of said knuckle, said front end of the lower swing arm being pivotally coupled to said lower end of the knuckle.

6. A motorcycle according to claim 1, wherein said lower swing arm includes an upwardly curved intermediate portion, said lower end of said damper being operatively coupled to a portion of said lower swing arm which is closer to said engine block than said upwardly curved intermediate portion.

7. A motorcycle according to claim 1, wherein said engine block comprises at least a crankcase having separable lower and upper crankcase members, said upper crankcase member being disposed on said lower crankcase member, and a cylinder assembly erected from said upper crankcase member, said rear end of the upper swing arm being pivotally coupled to a front portion of said cylinder assembly on one side of the engine block which is the same as the side on which said knuckle is disposed, said rear end of the lower swing arm being pivotally coupled to said lower crankcase member on one side of the engine block which is the same as the side on which said knuckle is disposed.

8. A motorcycle comprising:
front and rear wheels;
an engine disposed between said front and rear wheels and having an engine block comprising at least a crankcase having separable lower and upper crankcase members, said upper crankcase member being disposed on said lower crankcase member, said lower crankcase member having front opposite side walls including thick wall portions, respectively, a cylinder assembly erected from said upper crankcase member, and a cylinder head disposed on said cylinder assembly;
an elongate front wheel steering knuckle disposed on one side of said front wheel and having a lower end by which an axle of said front wheel is rotatably supported, said knuckle being inclined rearwardly and and extending upwardly;
an upper swing arm having a front end pivotally coupled to an upper end of said knuckle and a rear end pivotally coupled to said cylinder head on one side of the engine block which is the same as the side on which the knuckle is disposed, said upper swing arm extending between said knuckle and said engine;
a lower swing arm having a front end pivotally coupled to the lower end portion of said knuckle and at least one rear end pivotally coupled to at least one of said thick wall portions of said lower crankcase member, said lower swing arm extending between said knuckle and said engine; and
a damper having an upper end pivotally coupled to a front portion of said upper crankcase member and a lower end pivotally coupled to a base of said lower swing arm.

9. A motorcycle according to claim 8, wherein said lower swing arm has a boss projecting downwardly from said base thereof, said lower end of said damper being pivotally coupled to said boss.

10. A motorcycle according to claim 8, further including a side cover mounted on a side of said engine block and fastened to said upper and lower crankcase members by bolts.

11. A motorcycle comprising:
front and rear wheels;
an engine disposed between said front and rear wheels and having an engine block comprising at least a crankcase having separable lower and upper crankcase members, said upper crankcase member being disposed on said lower crankcase member, a cylinder assembly erected from said upper crankcase member, and a cylinder head disposed on said cylinder assembly;
an elongate front wheel steering knuckle disposed on one side of said front wheel and having a lower end by which an axle of said front wheel is rotatably supported, said knuckle being inclined rearwardly at a prescribed angle as viewed in side elevation and extending upwardly;
an upper swing arm having a front end serving as a first pivot point pivotally coupled to said knuckle and a rear end serving as a second pivot point pivotally coupled to said cylinder head on one side of the engine block which is the same as the side on which the knuckle is disposed, said upper swing arm extending between said knuckle and said engine;
a lower swing arm having a front end serving as a third pivot pivotally coupled to the lower end portion of said knuckle and at least one rear end serving as a fourth pivot point pivotally coupled to a front portion of said lower crankcase member, said lower swing arm extending between said knuckle and said engine;
said first, second, third, and fourth pivot points being positioned respectively at the corners of a parallelogram; and
a damper having an upper end pivotally coupled to a front portion of said upper crankcase member and a lower end pivotally coupled to a base of said lower swing arm.

12. A motorcycle according to claim 11, wherein said lower swing arm has a boss projecting downwardly from said base thereof, said lower end of said damper being pivotally coupled to said boss.

13. A motorcycle according to claim 12, wherein said knuckle has an extension inclined a prescribed angle rearwardly in side elevation and disposed on one side of said front wheel, said extension having a curved shape and extending from the lower end thereof to a position rearward of a top of said front wheel, and an upper end on said extension, said front end of said upper swing arm being pivotally coupled to said upper end of said knuckle, said front end of the lower swing arm being pivotally coupled to said lower end of the knuckle.

* * * * *

UNITED STATES PATENT AND TRADEMARK OFFICE
CERTIFICATE OF CORRECTION

PATENT NO.  : 4,756,379

DATED       : July 12, 1988

INVENTOR(S) : KAWANO et al.

It is certified that error appears in the above-identified patent and that said Letters Patent is hereby corrected as shown below:

```
Column 2, line 45, change "terefere" to --terfere--.
Column 4, line 66, delete "the" (one occurrence).
Column 6, line 18, change "an" to --a--;
         line 20, change "43" to --143--.
Column 7, line 19, change "knucle" to --knuckle--.
Column 8, line 55 (claim 2, line 1), change "2" to --1--.
Column 9, line 58 (claim 8, line 17), delete "and" (one
occurrence).
In the Abstract, line 20, correct the spelling of
--motorcycle--.
```

Signed and Sealed this

Sixth Day of December, 1988

Attest:

DONALD J. QUIGG

*Attesting Officer*            *Commissioner of Patents and Trademarks*